United States Patent Office 2,784,173
Patented Mar. 5, 1957

2,784,173

POLYMERIC POLYETHERS FROM BIS-QUATERNARY AMMONIUM COMPOUNDS AND DIFUNCTIONAL PHENOLIC COMPOUNDS

Marvin Carmack, Philadelphia, Pa., assignor to E. I. du Pont de Nemours and Company, Wilmington, Del., a corporation of Delaware No Drawing. Application July 17, 1952,
Serial No. 299,510

6 Claims. (Cl. 260—47)

This invention relates to a novel class of thermoplastic linear polymers and to processes for preparing the same. More particularly, the invention is concerned with linear polymers having alternating groups along the chain derived from bis-quaternary ammonium compounds and difunctional phenolic compounds.

Heretofore various polymeric ethers have been prepared, including those which are derived from compounds containing an oxirane ring. The present invention is concerned with a new class of polymeric ethers differing in chemical structure from the aforesaid previously known polyethers.

An object of the invention is to prepare polymers from bis-quaternary ammonium compounds and difunctional phenols.

It has been discovered, in accordance with this invention, that a novel class of polymeric ethers can be obtained by reaction between bis-quaternary ammonium compounds, such as bis-quaternary ammonium hydroxide, and difunctional phenols, especially phenols in which two hydroxyaryl groups are linked together at the para positions through a bi-valent radical which may be any one of the following:

alkylene, and

This bis-quaternary ammonium compounds which can be employed in the practice of the invention include the bis-quaternary ammonium compounds containing the radical

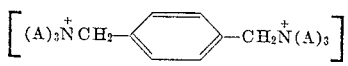

wherein A is a methyl group or other hydrocarbon group which does not, under the prevailing conditions, undergo degradation to olefin, e. g. neopentyl, phenyl, etc. Other bis-quaternary ammonium compounds which are effective include those which differ from the compounds just defined in that the aromatic nucleus in the structural formula given above contains one or more alkyl substituents or meta-directing substituents. As explained below, the quaternary ammonium compounds can be employed in the form of hydroxides or halides depending upon the reaction conditions chosen.

The phenols which are most effective in the practice of the invention include compounds of the formula p(HO—aryleno—)$_2$R wherein R is a bi-valent radical which may be any of the following:

alkylene, and

In addition to these compounds, the sodium or other alkali metal salts of these phenols may be employed provided the quaternary ammonium compound is a dihalide.

In one method of practicing the invention, a bis-quaternary ammonium halide is produced in the usual manner by reaction between the tertiary amine and a compound containing bis-chloroalkyl-substituted aromatic nucleus. If it is desired to employ the quaternary ammonium compound in the form of hydroxide, the halide thus obtained can be treated with a strong base or with a strong-base-ion-exchange resin. The resulting bis-quaternary ammonium hydroxide reacts readily at ordinary temperatures with the reactant containing two phenolic hydroxyl groups to produce a polymeric quaternary ammonium salt. This polymeric quaternary ammonium salt is converted to a polymeric ether by heating at temperatures within the range of 125–275° C. The conversion of the polymeric salt to the polymeric ether is accompanied by an escape of tertiary amine from the polymerization melt (cf. Hanhart and Ingold, J. Chem. Soc. 1927, 997, also Henley and Turner, J. Chem. Soc., 1931, 1172). In a specific embodiment, the formation of the polymeric salt and the conversion of the salt to a polymeric ether is illustrated by means of the following equations:

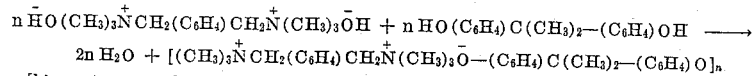
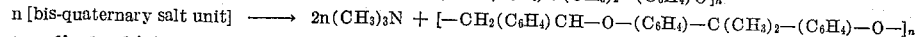

Any suitable strong-base-ion-exchange resin may be employed for the conversion of quaternary ammonium halide to quaternary ammonium hydroxide for use in the practice of the present invention. Generally speaking, these ion exchange resins are, in many instances, polymeric quaternary ammonium compounds which can be used to replace chloride or other halide in ionizable form by hydroxyl ions. As a result, the ion exchange resin itself is converted to a halide but it can be restored very readily by simply washing it with dilute aqueous sodium hydroxide. Such a commercial ion exchange resin is the material known as "Amberlite" IRA–410 strongly basic ion exchanger which is an ion exchange agent of the cross-linked polystyrene basic quaternary ammonium salt type as disclosed in Industrial and Engineering Chemistry 45, 2577, said agent being sold by the Rohm & Haas Co. and understood to be covered by U. S. Patent No. 2,591,573. The ion exchange resins are generally employed in granular form and it is simply necessary to conduct a solution of the quaternary ammonium halide through the ion exchange resin in its hydrolyzed form to produce an effluent which is free of halide. This can be done at ordinary temperatures if desired.

A practical method for carrying out the formation of the polymeric salt is to prepare an aqueous solution of the quaternary ammonium hydroxide by the method just described and to determine the strength of the aqueous solution of quaternary ammonium hydroxide by titration (using any suitable titration method such as titration with 0.1 normal hydrochloric acid and a pH meter to determine neutrality). The concentration of the quaternary ammonium hydroxide solution is not particularly critical. Satisfactory results are obtained with solutions which are very dilute or which may be 3 N or 4 N, or which may have an even higher normality. After determining accurately the quantity of quaternary ammonium hydroxide, an exactly equivalent amount of the bis-phenol is introduced. Since the formation of the polymeric salt appears to be an ionic reaction, it occurs very rapidly even at ordinary temperatures.

The conversion of the quaternary ammonium salt to a polyether is preferably preceded by a water removal step. Since the salt is quite stable, water can be removed therefrom by simply boiling it off at a temperature of 100° C. or under diminished pressure at a lower temperature if desired. Higher temperatures and pressures may be employed during the water removal step but there is generally no advantage in employing such higher temperatures or pressures. It is not necessary to remove all of the water so as to produce a purely anhydrous salt prior to conversion to the polymeric ether. The conversion of the polymeric quaternary ammonium salt to polyether may be carried out in the absence of a catalyst or in the presence of various materials which evidently have a catalytic effect upon the removal of teritary amine. The catalysts which are effective are effective are substances which tend to facilitate the migration and escape of the teritary amine and, therefore, they should probably not be regarded as true catalysts in the narrowest sense of the term. For example, dimethylformamide is effective in this manner and through the use of dimethylformamide the conversion of polymeric quaternary ammonium salt to polyether will take place quite readily at temperatures as low as 100° C. or even lower. In contrast with this result, the conversion of salt to polymeric ether does not occur in an aqueous medium at 100° C. Other solvents may be employed but there are relatively few solvents which do not cause a precipitation of the polymeric ether during the time when the tertiary amine is escaping. For example, n-butanol may be employed at 138° C. but this results in a precipitation of the polymer. Similarly, tetramethylene sulfone can be employed but this results in precipitation of the polymer in reaction systems having temperatures below the critical solution temperature of the system.

The invention can be illustrated further by means of the following examples.

*Example 1*—Bis(trimethyl ammonium chlorides) from 1,4-dichloro-2-butene, p-xylene dichloride, alpha$^1$,alpha$^4$-dichlorodurene, alpha$^1$,alpha$^5$-dichlorodurene, and alpha$^1$,alpha$^4$-dichlorohexamethylbenzene were prepared by mixing the dichloride in a methanol medium with an excess of trimethyl amine followed by stirring the mixture at room temperature in a flask fitted with a Dry Ice reflux condenser. When the initial rapid reaction had subsided, the stirring was continued at room temperature over night. Following this, the solutions were freed of solvent by evaporation and it was found that in each instance a quantitative yield of the quaternary ammonium chloride was obtained. Aqueous solutions of these bis-quaternary chlorides were passed through "Amberlite" IRA-410 strong-base-ion-exchange resin which was in the hydroxide cycle. The effluent was tested with silver nitrate solution to insure the absence of chloride ions. The strength of the effluent was determined by titration and an equivalent amount of purified biphenol was introduced. The biphenols employed with each of the aforementioned quaternary ammonium hydroxides were bis(4-hydroxyphenyl) sulphone, bis(4-hydroxyphenyl) ketone, and bis(4-hydroxyphenyl)-2,2-propane. In each instance, the resulting solutions were concentrated until a viscous syrup was obtained. The syrup was placed in a polymerization vessel and heated at a temperature of 138° C. under high vacuum until the evolution of trimethyl amine had ceased. The resulting polymer was permitted to cool and was removed by breaking the polymerization vessel. The polymer thus produced was a thermoplastic glassy resin which was hard and transparent and which could be molded into shaped objects very readily.

The polymers which are obtained by the method hereinabove described are useful in a variety of applications, including the manufacture of hard glassy, decorative objects, costume jewelry, coating compositions, laminated articles, and the like. The most worthwhile applications are those requiring the production of a smooth attractive hard glassy surface or coating, which may be water-clear, or colored with various common dyes or pigments.

For use in the aforesaid applications, the best polymers obtained as above described are those having a relatively high molecular weight, and which are manually spinnable. High molecular weight is achieved by carrying out the conversion of the quaternary ammonium salt to polymeric ether at a relatively low temperature within the preferred range hereinabove specified and at a relatively low pressure providing, of course, the tertiary amine evolution is continued until virtually no more tertiary amine can be expelled from the polymer melt. The polymeric ethers thus obtained correspond with at least 3-bis-quaternary units in the polymeric salt, i. e. n in the formulations given above is at least 3. It is to be understood, of course, that the number of units will clearly exceed 3 in most instances and indeed in some cases is as high as 700 or more.

Since many different embodiments of the invention will occur to those who are skilled in the art, it will be understood that the invention is not limited except as set forth in the following claims.

I claim:

1. A process for preparing a polymeric quaternary salt which comprises reacting a bis-quaternary ammonium hydroxide with a compound of the class consisting of

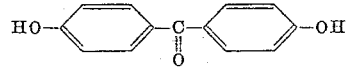

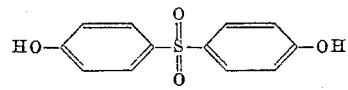

and

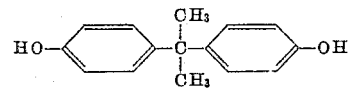

in equivalent proportions in an aqueous medium, said bis-quaternary ammonium hydroxide being a compound obtained by substitution, by means of a strongly basic ion exchange agent, of —OH for —Cl in a bis-quaternary trimethyl ammonium chloride obtained by reaction of trimethyl amine with a compound of the class consisting of 1,4-dichloro-2-butene, p-xylylene dichloride, alpha',-alpha$^4$-dichlorodurene, alpha',alpha$^5$-dichlorodurene, and alpha',alpha$^4$-dichlorohexamethylbenzene.

2. A process for preparing a polymeric ether which comprises reacting a compound of the formula

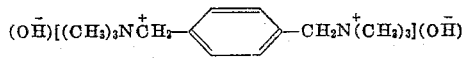

with a compound of the formula

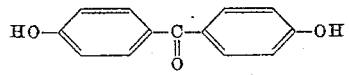

in an aqueous medium in equivalent quantities, removing water from the resulting solution, heating the residue thus obtained to a decomposition temperature not exceeding 275° C. until evolution of trimethyl amine substantially ceases, whereby a polymeric ether is produced.

3. A process for preparing a polymeric ether which comprises reacting a compound of the formula

with a compound of the formula

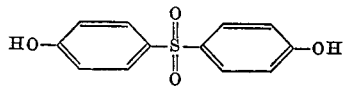

in an aqueous medium in equivalent quantities, removing water from the resulting solution, heating the residue thus obtained to a decomposition temperature not exceeding 275° C. until evolution of trimethyl amine substantially ceases, whereby a polymeric ether is formed.

4. A process for preparing a polymeric ether which comprises reacting a compound of the formula

with a compound of the formula

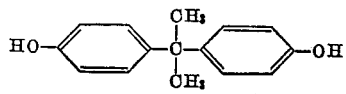

in an aqueous medium in equivalent quantities, removing water from the resulting solution, heating the residue thus obtained to a decomposition temperature not exceeding 275° C. until evolution of trimethyl amine substantially ceases, whereby a polymeric ether is produced.

5. Process of claim 3 as performed in the presence of dimethylformamide at a temperature within the range of 100° to 275° C.

6. Process of claim 3, as performed in the absence of catalyst and solvent medium at a temperature of 125° to 275° C.

References Cited in the file of this patent
UNITED STATES PATENTS 2,060,176    Arvin ------------------ Nov. 10, 1936

OTHER REFERENCES

Tarbell et al.: Journal Amer. Chem. Soc., vol. 65, pp. 231 to 3 1943.  (Copy in Scien. Lib.)

Ingold: Journal Chem. Soc. (London) 1931, pp. 1666 to 83.  (Copy in Scien. Lib.)